United States Patent Office 3,022,096
Patented Feb. 20, 1962

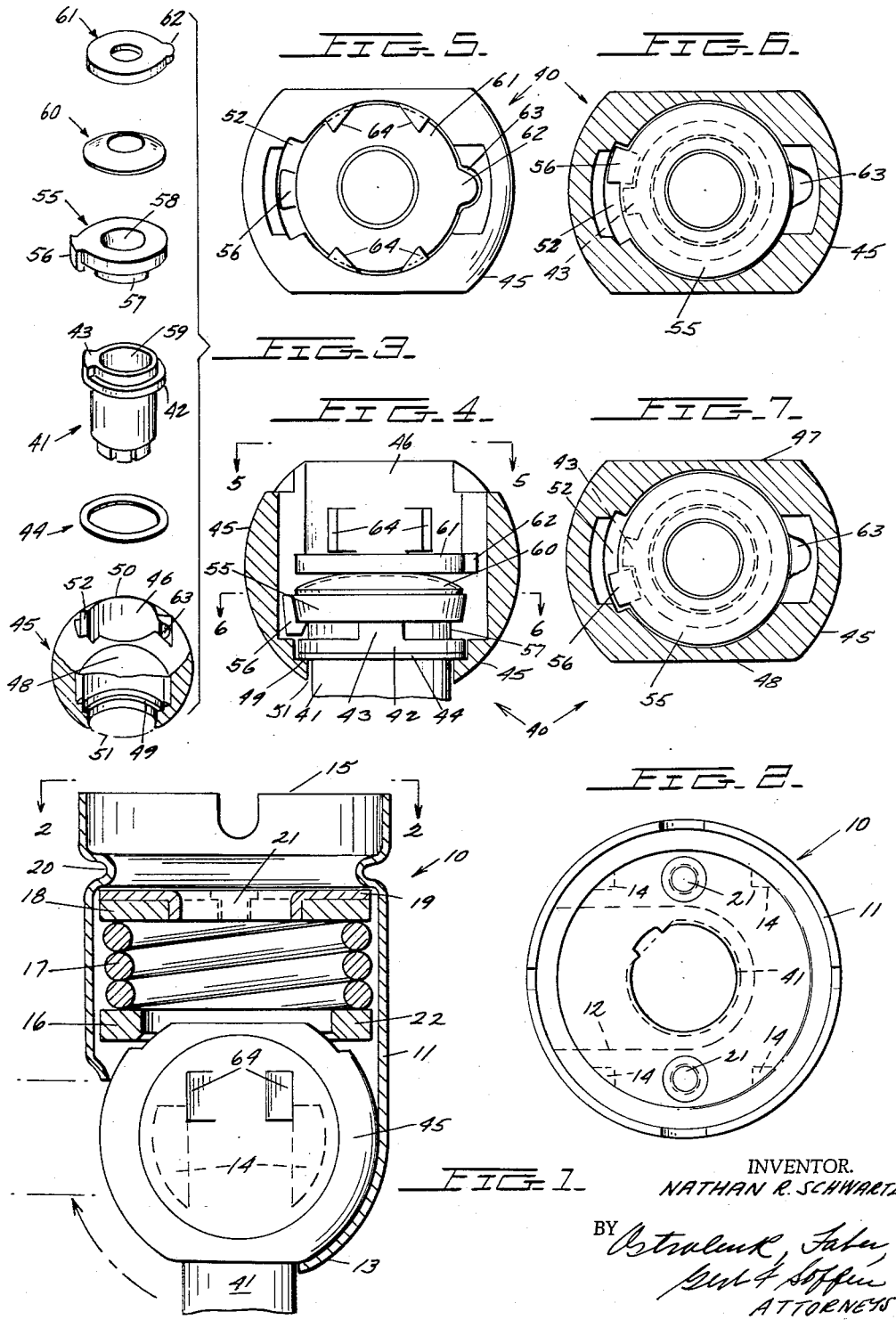

3,022,096
FULL TURN SWIVEL UNIT FOR ELECTRICAL FIXTURES
Nathan R. Schwartz, Yonkers, N.Y., assignors, by mesne assignments, to Swivelier Company, Inc., Nanuet, N.Y., a corporation of New York
Filed Aug. 22, 1957, Ser. No. 679,668
3 Claims. (Cl. 285—164)

This application is a continuation-in-part of co-pending application Serial No. 370,928, filed July 29, 1953, now abandoned, and relates to an improved full turn swivel unit to which electrical lighting fixtures are to be attached. More particularly, it relates to an improved construction of the ball assembly forming part of the swivel unit.

Lighting fixtures often include swivel units so that the light rays from the fixture may readily be directed to a given area even though the fixture is securely fastened to a wall or table. This invention permits the light source and its housing to be pivoted through an angle of 90° by means of the cooperation of the ball assembly and swivel unit shell. The ball assembly is further constructed to permit the light source to rotate through a full revolution with respect to the axis of the ball assembly. A combination of the 90° and full revolution movements permits the light rays to be directed over a large area without any blind spots in the area.

It is desirable not to allow rotation of the light source to exceed a full revolution in order to prevent excessive twisting and eventual breakage of the leads carrying current to the light source. However, in order to avoid blind spots the rotation must be at least a full 360°.

Many prior art devices of this type achieve limited rotation through the cooperation of a plurality of members, with rotation permitted between any two, being some value less than 360° and determined by the thickness of the stops extending from the members.

Construction of the present ball assembly is simplified in that the nipple and a rotation limiting member are cast as one piece and the collar member cooperating therewith includes a stop lug which is positioned to float within a slot parallel to the ball assembly axis and formed in the inside surface of the spherical member. Also, the sides of the spherical member are staked inwardly to retain the members of the ball assembly within the spherical member rather than using screws or other retaining means of the prior art.

Devices of this kind are readily mass produced with the extensive utilization of die cast members. When two die cast members are in rubbing, zinc to zinc, contact a metallic buildup results to thereby interfere with the smooth operation of the device. I have provided a steel washer interposed between two ball assembly members which would otherwise be in rubbing contact to thereby prevent metal buildup.

In this invention the conventional coil spring of the ball assembly has been replaced by a Belleville type washer spring, which is of concavo-convex or frusto-conical shape, thereby eliminating serious finishing problems attendant with the use of coil springs if they are to exert a force on a plane normal to the spring axis. The washer type spring also enables an equal force to be applied for either direction of rotation whereas using a coil spring rotation in one direction requires more force than rotation in the other direction and it is also often difficult to obtain a smooth movement between angular positions.

Accordingly, a primary object of this invention is to provide an improved and simplified construction for a ball assembly that is part of a swivel unit for mounting electric lighting fixtures.

Another object is to provide means whereby the nipple of the ball assembly may be rotated about its axis through a full revolution, but wherein further rotation is prevented.

Still another object is to form the swivel member with a slot on the inside surface thereof wherein one stop lug may float to compensate for the thickness of all the cooperating lugs thereby limiting rotation to a single revolution.

A further object is to die cast as many parts as possible and reduce the number of parts necessary to achieve the controlled limited rotation.

A still further object is to interpose a thin steel washer between the seat of the die cast spherical member and the collar of the die cast nipple to prevent metallic buildups between these parts.

Yet another object is to maintain the internal parts of the ball assembly under pressure and to retain the parts within the spherical member by staking the sides of the spherical member.

These as well as other objects of the present invention will readily become apparent after reading the following description of the accompanying drawings in which:

FIGURE 1 is a longitudinal section of the swivel unit of the instant invention.

FIGURE 2 is a plan view looking in the direction of the arrows 2—2 of FIGURE 1.

FIGURE 3 is an exploded view of the ball assembly.

FIGURE 4 is a longitudinal section of the assembled ball assembly.

FIGURE 5 is a plan view looking in the direction of the arrows 5—5 of FIGURE 4.

FIGURE 6 is a section taken through line 6—6 of FIGURE 4 and looking in the direction of the arrows 6—6.

FIGURE 7 is a view similar to FIGURE 6 with the nipple of the ball assembly rotated 360° from the position of FIGURE 6.

Swivel unit 10, illustrated in FIGURES 1 and 2, comprises an elongated cylindrical shell 11 wherein ball assembly 40 is pivotally disposed. Slot 12 extends from the apex of the dome shaped end 13 of shell 11 down the sidewall thereof. Nipple 41 extends through slot 12 and cooperates therewith to limit relative movement between ball assembly 40 and shell 11 to a 90° pivot about an axis normal to the longitudinal axis of shell 11.

Swivel unit 10 is assembled by inserting ball assembly 40 through end 15 of shell 11 until nipple 41 extends through slot 12 and spherical member 45 rests against dome shaped end 13. Cup-shaped washer 16, coil spring 17, steel washer 18, and fiber washer 19 are inserted in the order recited. Coil spring 17 is then loaded and shell 11 is circumferentially impinged at 20 to maintain the loading of spring 17 and retain the parts within shell 11. The loading of spring 17 forces the unit parts firmly together so that ball assembly 40 will remain in the position to which it has been rotated. Tapped openings 21 are provided in steel washer 18 for convenience in securing a lamp reflector (not shown) or other parts of a lamp fixture to swivel unit 10.

Referring more particularly to FIGURES 3 through 7, ball assembly 40 comprises spherical member 45 wherein steel bearing washer 44, nipple 41, ring member 55, spring washer 60, and closing washer 61 are disposed. Central opening 46 extends through spherical member 45 to receive the other members of ball assembly 40. Opposed flat surfaces 47, 48 on the outer surface of spherical member 45 are positioned parallel to the axis of central opening 46 and cooperate with shell indentations 14 to prevent relative movement between spherical member 45 and shell 11 about the longitudinal axis thereof.

Ball assembly 40 is assembled by first placing steel bearing washer 44 on circumferential seat 49 which extends inwardly from the wall surrounding central opening 46. Nipple 41 is entered through one end 50 of opening 46 and extends through the other end 51 thereof with nipple collar 42 resting on bearing washer 44. Lug 43 projects from collar 42 toward end 50 of opening 46 for a purpose to be hereinafter explained.

Ring member 55 is placed adjacent to nipple 41 with ridge 57 surrounding opening 58 of ring member 55, nesting in opening 59 of nipple 41. Stop lug 56 extends radially outward from ring member 55 and extends axially toward end 51 of opening 46. The radially extending portion of stop lug 56 is positioned within stop slot 52 which is formed in the inside wall of spherical member 45.

Concavo-convexly shaped spring washer 60 is entered into opening 46 to rest on ring member 55 and closing washer 61, with ear 62 positioned in spherical member slot 63, is placed adjacent to spring washer 60. Spring 60 is lightly loaded and the flat surfaces 47, 48 of spherical member 45 are then inwardly deformed forming staking portions as at 64 to maintain the loading on spring 60 and retain members 41, 44, 55, 60 and 61 within spherical member 45.

Nipple 41, to which a lamp reflector (not shown) or other part of an electric lamp fixture is to be attached, may be rotated from its extreme clockwise position of FIGURE 6 to its extreme counterclockwise position of FIGURE 7. Nipple lug 43 cooperates with stop lug 56 which in turn floats within stop slot 52 to limit nipple rotation to exactly 360° with the width of slot 52 being as wide as the width of lug 43 plus two times the width of stop lug 56. Thus a minimum number of parts have been used to achieve the limited rotation formerly requiring the use of many more parts.

Steel bearing washer 44 has been inserted between die cast nipple 41 and die cast spherical member 45 to prevent rubbing contact therebetween and thereby prevent zinc buildup which would eventually cause a malfunction. Spring washer 60, being partially loaded, forces the ball assembly members firmly against each other to enable the nipple to remain in the angular position to which it has been rotated. Ear 62 of closing washer 61 is provided to prevent rotation of this member which in turn acts to increase the frictional engagement between parts of ball assembly 40.

It is to be noted that all members of swivel unit 10 have openings therethrough which communicate with one another to provide a continuous passage through swivel unit 10 for electrical leads (not shown) regardless of the relative position of the parts. To this end a portion of cup-shaped washer 18 is cut away at 22 in order to prevent crushing of the electrical leads when nipple 41 is pivoted to the position 90° from the longitudinal axis of shell 11.

In the foregoing, this invention has been described only in connection with preferred embodiments thereof. Many variations and modifications of the principles of this invention within the scope of the description herein are obvious. Accordingly, it is preferred to be bound not by the specific disclosure herein, but only by the appending claims.

I claim:

1. A swivel unit, including a ball assembly, for mounting electrical fixtures; said ball assembly comprising a spherically surfaced member having a central opening therethrough defined by an inner wall thereof; a nipple partially disposed within said spherically surfaced member and extending through a first end of said opening; a circumferential seat extending inwardly from the inner wall of said spherically surfaced member and positioned near said first end; said nipple having a collar in operative engagement with said seat to limit outward movement of said nipple through said first end; a lug extending from said nipple collar; a ring member including a stop lug operatively positioned for engagement by said nipple lug; said stop lug also being partially disposed within a stop slot in said inner wall; said stop slot being at least as wide as the width of said nipple lug plus twice the width of said stop lug; said stop lug and said nipple lug cooperating with said stop slot to permit rotation of said nipple relative to said spherically-surfaced member for a full revolution and to limit further rotation; said swivel including a partially loaded spring washer entered into said central opening and bearing against said ring member to maintain the members disposed within said spherically shaped member in frictional engagement; a closing washer entered into said opening and bearing against said spring washer, means preventing relative rotation between said closing washer and said spherically-surfaced member, and means to maintain the loading of said spring washer and to retain the elements entered into said opening.

2. The swivel unit of claim 1 in which the spherically-surfaced member has opposed flat surfaces on the outside thereof; said flat surfaces having staking portions extending inwardly therefrom and positioned to maintain the loading of said spring washer and retain the elements entered into said opening.

3. The swivel unit of claim 1 in which the ball assembly is pivotally disposed in an elongated shell having a dome-shaped end; a slot extending from the apex of the dome-shaped end of said shell to a side wall thereof; the nipple disposed within said ball assembly extending through said slot so as to provide rotation thereof about an axis normal to the longitudinal axis of said shell.

References Cited in the file of this patent

UNITED STATES PATENTS

| | | |
|---|---|---|
| Re. 15,058 | Heina | Mar. 8, 1921 |
| 1,175,402 | Baylis | Mar. 14, 1916 |
| 1,627,964 | Galloway | May 10, 1927 |
| 2,242,303 | Irmisher | May 20, 1941 |
| 2,255,262 | MacFadden | Sept. 9, 1941 |
| 2,456,182 | Goble | Dec. 14, 1948 |
| 2,617,619 | Versen | Nov. 11, 1952 |
| 2,632,660 | Krauthamer | Mar. 24, 1953 |
| 2,684,259 | Schwartz | July 20, 1954 |